United States Patent

Musolff

(10) Patent No.: US 8,521,974 B2
(45) Date of Patent: Aug. 27, 2013

(54) MIGRATION OF DATA IN A DISTRIBUTED ENVIRONMENT

(75) Inventor: Bradley D. Musolff, Conifer, CO (US)

(73) Assignee: International Business Machines Corporation, Armonk, NY (US)

( * ) Notice: Subject to any disclaimer, the term of this patent is extended or adjusted under 35 U.S.C. 154(b) by 276 days.

(21) Appl. No.: 12/952,235

(22) Filed: Nov. 23, 2010

(65) Prior Publication Data

US 2012/0131391 A1    May 24, 2012

(51) Int. Cl.
G06F 12/00 (2006.01)
G06F 11/07 (2006.01)

(52) U.S. Cl.
USPC ............... 711/162; 711/165; 711/E12.001; 714/48; 714/E11.025

(58) Field of Classification Search
USPC ............... 711/162, 165, E12.001; 714/48, 714/E11.025
See application file for complete search history.

(56) References Cited

U.S. PATENT DOCUMENTS 7,080,221 B1    7/2006    Todd et al.
7,278,000 B2    10/2007   Nonaka et al.
7,376,764 B1    5/2008    Todd

OTHER PUBLICATIONS

Sudip Chahal et al, Testing Live Migration with Intel Virtualization Technology FlexMigration, Intel Corporation, Jan. 2009, 12 pp.
Jon Oberheide et al, Empirical Exploitation of Live Virtual Machine Migration, University of Michigan, 2009-2010, 6 pp.
Timothy Wood et al, Memory Buddies: Exploiting Page Sharing for Smart Colocation in Virtualized Data Centers, University of Massachusetts, Northeastern University, Mar. 2009, 10 pp.

*Primary Examiner* — Yong Choe
(74) *Attorney, Agent, or Firm* — Patrick J. Daugherty; Driggs, Hogg, Daugherty & Del Zoppo Co., LPA (57) ABSTRACT

Embodiments of the invention migrate dynamically changing data sets in a distributed application environment. Writes to a source device are intercepted and it is determined whether data in the source device is being migrated to a target device. If data is being migrated, then the intercepted write is mirror written synchronously to both the source and the target. Data being migrated is read from a region of the source and written to a region of the target and also to a mirror writing memory location. The source region data is re-read and compared to the originally read data that is written to the mirror writing memory location. If the compared data does not match, the data migration from the source region to the target region (and to the mirror writing memory location) is repeated until the originally read data and the re-read data match.

21 Claims, 4 Drawing Sheets

MIGRATION OF DATA IN A DISTRIBUTED ENVIRONMENT

TECHNICAL FIELD

The present invention relates to systems and methods for migrating or copying dynamically changing data sets with host-based software in a clustered or otherwise distributed application environment.

BACKGROUND

Migrating or moving live data in a distributed environment presents complexities in avoiding race conditions while copying data, wherein newer data from one application may be overwritten with older data from another application. For example, if appropriate protections are not in place, older, out of date records may overwrite newly modified records in a database table, which may cause the new records to be permanently lost.

Some single-system solutions protect against race conditions by using a simple locking approach. However, creating a usable, consistent copy of data while the data is being updated simultaneously from multiple host computers is more complex, particularly when the migration solution is host-based wherein a software utility runs on the compute nodes of the distributed cluster rather than on storage devices or a storage fabric involved in the migration. In such an environment, a race condition can exist when updating data simultaneously from several nodes which could result in lost data on the target storage device.

Existing solutions may include using some sort of communication mechanism between machines to ensure that data can be copied atomically from source to target in a sort of distributed locking, so that race conditions between nodes updating the same data are avoided. However, solutions that rely on inter-node communication are inherently complicated and also dependent on a reliable, fast communication mechanism between nodes to accomplish the task with minimal performance impacts. As a result, such solutions can be sensitive to the performance and reliability of the associated communication mechanisms which are commonly network or disk storage based.

BRIEF SUMMARY

In one embodiment, a method is provided for migrating dynamically changing data sets in a distributed application environment. The method includes intercepting (via a host device) a write to a source device in communication with the host device through a distributed application environment, and determining whether data in the source device is being migrated to a target device in communication with the host device and the source device through the distributed application environment. If data in the source device is not being migrated to the target device, the intercepted write is passed directly to the source. However, if data in the source device is being migrated to the target device, then the intercepted write is mirror written synchronously to both the source and the target. Accordingly, the data migrating from the source to the target is read from a region of the source and written to a region of the target and also to a mirror writing memory location. The source region data is re-read and compared to the originally read data that is written to the mirror writing memory location. If the compared data does not match, the data migration from source region to target region (and to the mirror writing memory location) and comparing, etc., is repeated until the originally read data and the re-read data match. The process repeats for each of other regions of the source and target until each region is migrated.

In another embodiment, a computer system includes a processing unit, computer readable memory and a computer readable storage system. Program instructions on the computer readable storage system cause the processing unit to intercept a write to a source device in communication with the processing unit through a distributed application environment, and determining whether data in the source device is being migrated to a target device in communication with the processing unit and the source device through the distributed application environment. If data in the source device is not being migrated to the target device, the intercepted write is passed directly to the source. However, if data in the source device is being migrated to the target device, then the intercepted write is mirror written synchronously to both the source and the target. Accordingly, the data migrating from the source to the target is read from a region of the source and written to a region of the target and also to a mirror writing memory location. The source region data is re-read and compared to the originally read data that is written to the mirror writing memory location. If the compared data does not match, the data migration from source region to target region (and to the mirror writing memory location) and comparing, etc., is repeated until the originally read data and the re-read data match. The process repeats for each of other regions of the source and target until each region is migrated.

In another embodiment, a computer program product includes program instructions to intercept a write to a source device in a distributed application environment, and determining whether data in the source device is being migrated to a target device in communication with the source device through the distributed application environment. If data in the source device is not being migrated to the target device, the intercepted write is passed directly to the source. However, if data in the source device is being migrated to the target device, then the intercepted write is mirror written synchronously to both the source and the target. Accordingly, the data migrating from the source to the target is read from a region of the source and written to a region of the target and also to a mirror writing memory location. The source region data is re-read and compared to the originally read data that is written to the mirror writing memory location. If the compared data does not match, the data migration from source region to target region (and to the mirror writing memory location) and comparing, etc., is repeated until the originally read data and the re-read data match. The process repeats for each of other regions of the source and target until each region is migrated.

In another embodiment a service provides for migrating dynamically changing data sets in a distributed application environment. The service comprehends providing a computer infrastructure that intercepts a write to a source device a distributed application environment and determines whether data in the source device is being migrated to a target device. If data in the source device is not being migrated to the target device, the computer infrastructure passes the intercepted write directly to the source. However, if data in the source device is being migrated to the target device, then the computer infrastructure mirror writes the intercepted write synchronously to both the source and the target. Further, the data migrating from the source to the target is read from a region of the source and written to a region of the target and also to a mirror writing memory location. The source region data is re-read and compared to the originally read data that is written to the mirror writing memory location. If the compared data does not match, the data migration from source region to target region and to the mirror writing memory location, the comparing, etc., is repeated until the originally read data and the re-read data match. The computer infrastructure repeats this process for each of other regions of the source and target until each region is migrated.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that is not signal medium and that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

One of the complexities of migrating a live data set involves avoidance of race conditions while copying data wherein newer data is overwritten with older data. For example, if appropriate protections are not in place, older, out of date records may overwrite newly modified records in a database table, which may cause the new records to be permanently lost. Some prior art single-system solutions protect against race conditions by using a simple locking approach.

Figure 1:
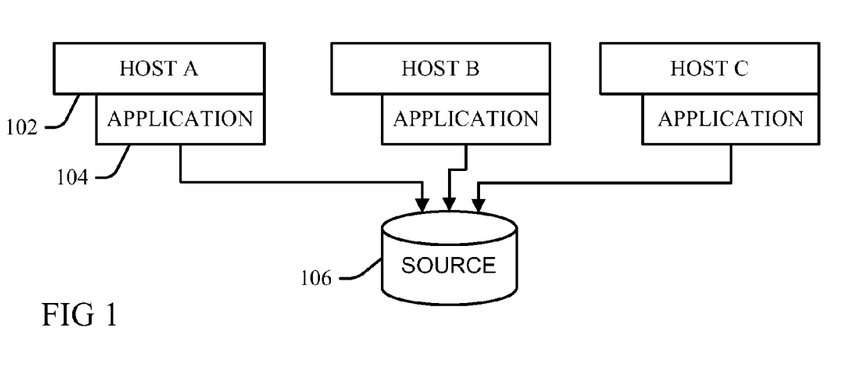
FIG. 1 is a diagrammatic illustration of an embodiment of a system, method or process according to the present invention for writing to a shared source storage device in a distributed application environment.

FIG. 1 is a block diagram illustration of a distributed application environment according to the present invention wherein a plurality of applications 104 of each of a plurality of host 102 sends writes to the same shared source storage device 106. Although the present embodiment has been implemented at a host block driver level, it will be understood that other levels of operation are possible in other embodiments and implementations.

Migrating dynamically changing data sets in the shared source storage device 106 present problems. Creating a usable, consistent copy of data while the data is being updated simultaneously from multiple host computers 102 is complex, particularly when the migration solution is host-based wherein a software utility runs on the compute nodes of the distributed cluster rather than on storage devices or a storage fabric involved in the migration. In such an environment, a race condition can exist when updating data simultaneously from several nodes which could result in lost data on the target storage device.

Prior art solutions may include using some sort of communication mechanism between machines to ensure that data can be copied atomically from source to target in a sort of distributed locking, so that race conditions between nodes updating the same data are avoided. However, solutions that rely on inter-node communication are inherently complicated and also dependent on a reliable, fast communication mechanism between nodes to accomplish the task with minimal performance impacts. As a result, such solutions can be sensitive to the performance and reliability of the associated communication mechanisms which are commonly network or disk storage based.

Figure 2:
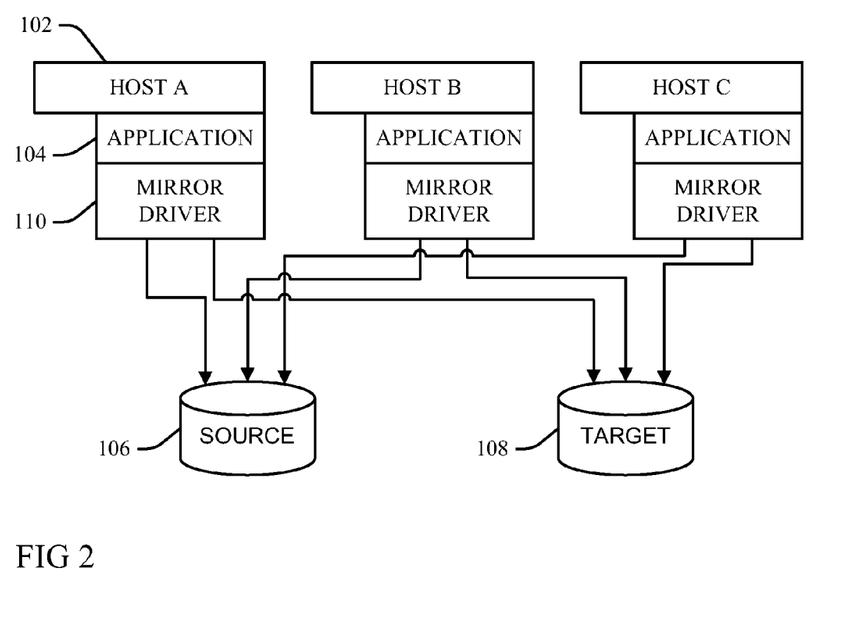
FIG. 2 is a diagrammatic illustration of mirror drivers or processes within the distributed application environment of FIG. 1 according to the present invention.
Figure 3:
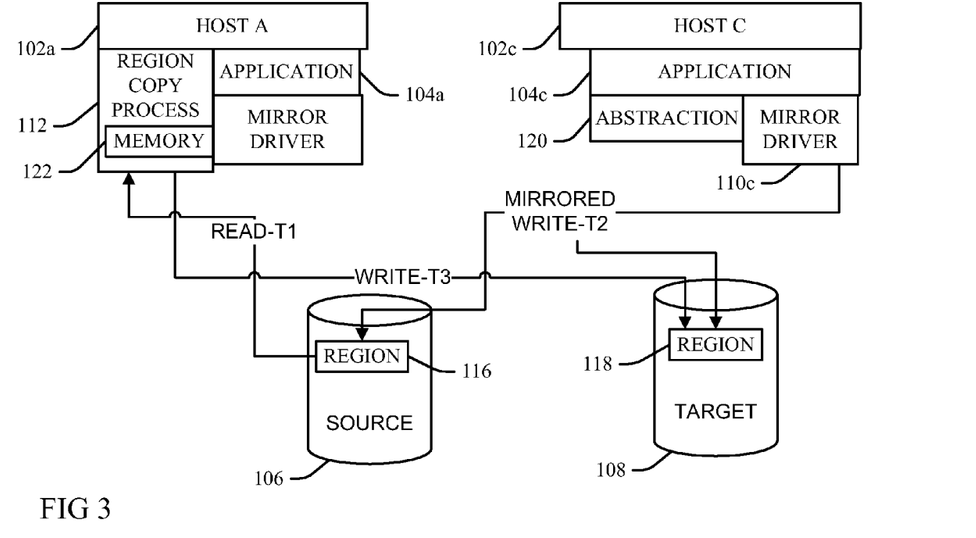
FIG. 3 is a diagrammatic illustration of a data migration within the distributed application environment of FIGS. 1 and 2 according to the present invention.

In contrast, FIG. 2 illustrates a plurality of mirror drivers or processes 110 associated with each of the applications 104 according to the present invention wherein of each of the mirror drivers 110 ensures that all new incoming data is mirror copied to both the shared source storage device 106 and a shared target storage device 108 during a migration of data from the source 106 to the target 108. FIG. 3 illustrates a migration according to the present invention wherein a region copy process 112 on a single host 102a application 104a copies a data region or extent 116 within the source 106 by reading the region/extent 116 of data from the source 106 and writes the same extent of data to a region or extent 118 within the target 108. The regions/extents 116/118 may be one or more memory blocks or discrete sets of memory blocks in the source 106 and target 108, and other region or extent definitions will be apparent to one skilled in the art. (It will be understood that each of the other hosts B and C 102 may also invoke a region copy process 112 for a data migration from the source 106 to the target 108, and illustration of their respective copy processes is omitted for simplicity of illustration only.) The region copy process 112 may be done serially, or in parallel using multiple threads or processes to move the data.

Simultaneously with the region copy process 112 data copying, the mirror driver 110c of the application 104c of the host C 102c intercepts application-originated writes to an abstraction 120 in the host C 102c that represents the physical source storage device 106 (for example, an existing disk, LUN (Logical Unit Number), a volume or pseudo-volume manager device driver, a regular device file, etc.) and also mirrors the writes synchronously to source 106 and target 108. Synchronously will be understood to mean that each write must be acknowledged as being mirror written to both the source 106 and target 108 storage devices before being acknowledged to an upper layer, such as a file system or application.

The region copying process 112 copies all region/extent memory blocks from source 106 to target 108 to accomplish the migration. If the data is not "live" and changing, this process 112 would be sufficient to migrate the data. However, in the distributed application environment of the present embodiment, new data may be also be written to the source simultaneously by any of the applications 104. More particularly, in the present example, the indicators T1, T2, and T3 represent a potential sequential timing of read and write events, wherein (1) the source region 116 is first read by the region copy process 112 READ-T1, which is followed by (2) the MIRRORED WRITE-T2 of new data to both the source region 116 and the target region 118, which is then followed by (3) the WRITE-T3 of the data copied by the copy process 112 to the target region 118. Thus, a race condition has occurred, wherein the WRITE-T3 is a write of older data subsequent to (and therefore replacing) the newer MIRRORED WRITE-T2 data, so the target storage region 118 will have old or 'stale' data written to it by the copying process 112, while the source region 116 will instead have the new data mirror written to it by the MIRRORED WRITE-T2.

Figure 4:
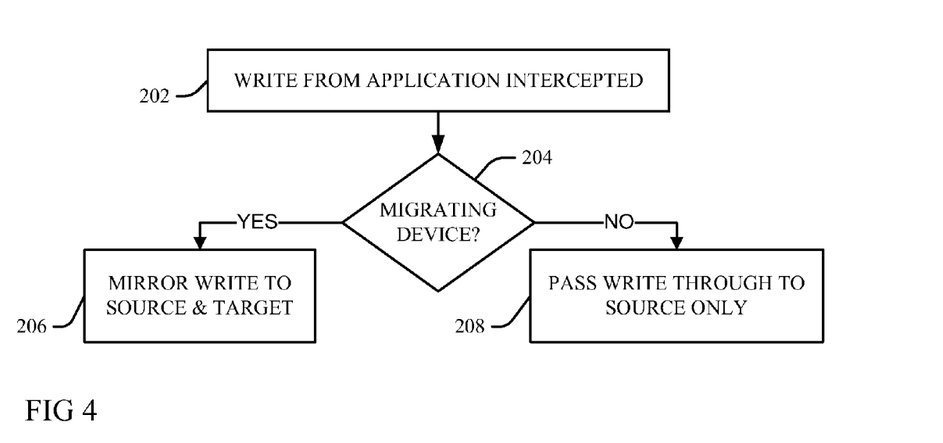
FIG. 4 is a diagrammatic illustration of a process for intercepting writes to a migrating device within the distributed application environment of FIGS. 1, 2 and 3 according to the present invention.
Figure 5:
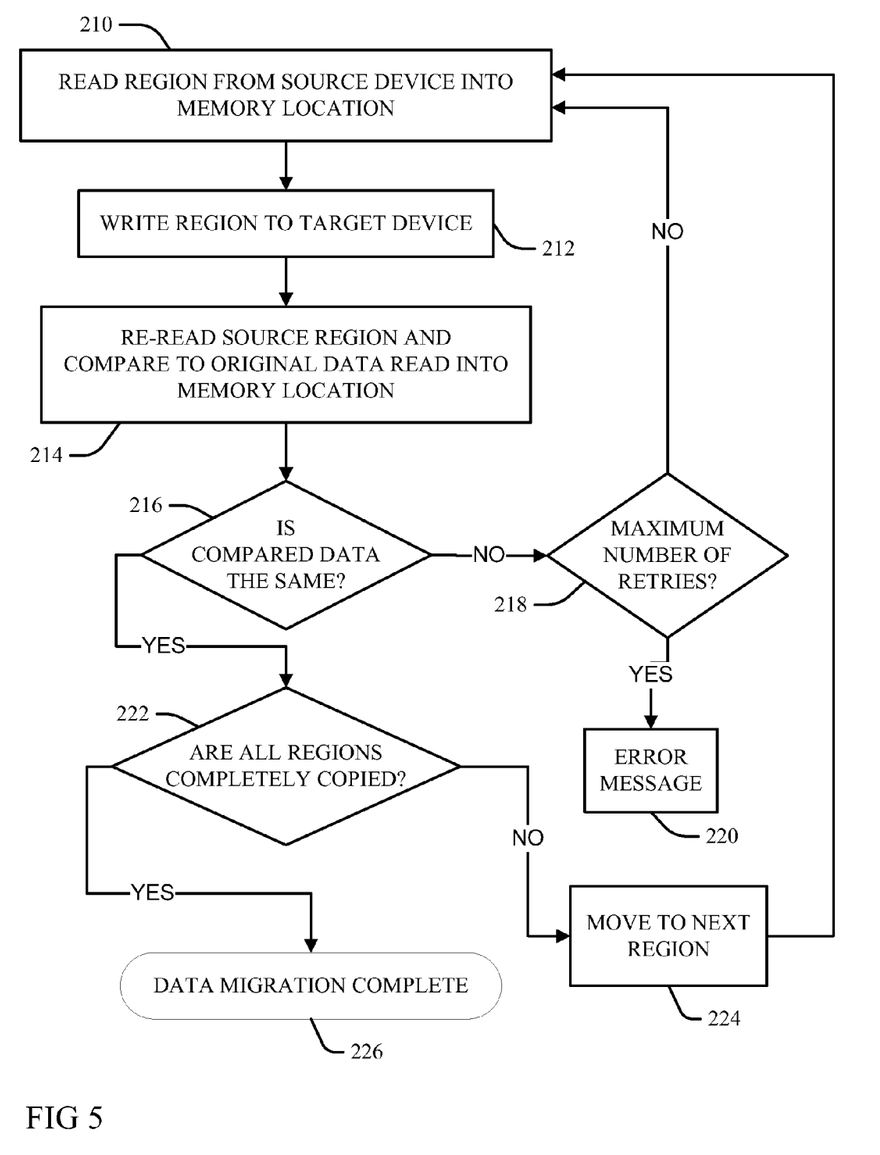
FIG. 5 is a diagrammatic illustration of a process for detecting and correcting race conditions in the migrating process of FIGS. 1-4 according to the present invention.

Embodiments of the present invention employ two parallel processes during the course of a migration, illustrated by FIGS. 4 and 5, and described with respect to the elements of FIGS. 1-3. In the first process of FIG. 4, at 202 a host application 104 intercepts a write to the source device 106 and determines at 204 whether data in the source device 106 is being migrated to the target 108. If data is not being migrated, then at 208 the write is passed through to the source directly. But if data is being migrated, then at 206 an associated mirror driver 110 mirror-writes the intercepted write to both the source 106 and target 108, ensuring that any changing data is written to both the source and the target, ensuring an identical copy at all times.

FIG. 5 illustrates a second parallel "detect and correct" migrating process, wherein the source region data 116 is migrated to the target region 118 by being read into a memory location 122 of the region copy process 112 at 210, and then written to the target region 118 at 212. At 214 the region copy process 112 re-reads the source region 116 data and compares the re-read data to the data originally read at 210 and stored in the region copy process 112 memory location 122. If the comparison shows that the data is not the same, then at 218/210 the migration is iteratively retried (thereby copying any subsequent, newer mirror-written data from the source region 116 to the target region 118) until the originally read data and the re-read data match at 216, or a maximum number of retries has been attempted as determined at 218, wherein an error message is generated 220 signaling that the migration is not successful (i.e. as the source 106 data has been updated, and we cannot verify that the updated data has been copied to the target 108, then the target 108 has old or corrupted data that is not the same as the source 106 data, for example an uncorrected race condition has occurred.) In some embodiments, retries may be performed indefinitely at 216-210, without imposing a limit at 218.

Unless the error message is triggered at 220, upon verification that the compared data is the same at 216, the process then iteratively steps through each region at 222 and 224 until all regions 116 of the source have been copied, wherein the process ends at 226. Embodiments of the present invention detect and correct process include memory resident processes and threads, and more than one may be occurring in parallel, each working on a different region/extent 116/118.

In some embodiments, the mirror writing process by the mirror driver 110c further comprises determining which regions 116, 118 of the source 106 and target 108 respectively are currently engaged in the migrating process by the region copy process 112a and delays mirror writing for such regions 116, 118 at 206 (FIG. 4) until said region copying/migrating is complete, which may help prevent at least the current, intercepted write from causing a race condition. The "detect and correct" process of FIG. 5 is still implemented in these embodiments to correct any race conditions caused by any other writes during the migration.

Thus, embodiments may correct or prevent race conditions without locking down either the source regions 116 or the target regions 118. In contrast, prior art approaches use lock down techniques adapted from single host applications. However, locking in a single host or a RAID array (Redundant Array of Independent Disks) is trivial, since the locking is not distributed over a network). Such locking is more complex, and slower, when done between two separate machines. In the case of two hosts that update the same storage device 106 simultaneously, such locking would involve a copy process on one node sending a message to both nodes to obtain a lock on the region being copied, before proceeding to copy the region. This inter-node messaging copy process, as well as the time penalty inherent in communication across nodes, can be avoided however, through processes according to the present invention where no lock is necessary or done. Although the potential for a race condition remains in which older data could overwrite newer data on the target, embodiments of the present invention simply correct race situation problems without locking but instead through comparing the originally read data and current source data.

Prior art methods for dealing with races in distributed computing often focus on prevention, in another aspect since event timing is often difficult to predict, and race occurrences can be difficult to detect. Moreover, the prior art may assume that the retry steps 216-218-210 may retry forever, or error out often. However, applicant has observed that it is unlikely in distributed host environments for a storage system to write so heavily to a particular region 116/118 as to make the process of FIG. 5 fail due to infinite retries. Instead, applications, file systems, and storage systems are typically designed so that such heavy writes to an individual block or region 116/118 will not occur, otherwise application performance would suffer. This allows a reasonable window in many cases to succeed with the retry steps 216-218-210.

In another aspect, it is also believed that race conditions generally occur relatively infrequently in view of the number of blocks or disk regions being copied during a typical migration in a distributed host environment. Therefore, it is possible to employ approaches according to the present invention that do not aim to prevent a race condition from occurring, but instead simply detects and corrects the situation if and when it does occur.

Thus, in embodiments according to the present invention, detection and correction can all be accomplished within the processing context of a single compute node, so that migrating the data does not require communication between nodes. By eliminating the extra steps of locking a region down before migrating it, and unlocking each region as well, embodiments do not incur the overhead involved in the associated communications necessary to obtain and release such locks. In addition, avoiding such locking reduces software complexity, which results in more reliable, robust software and computing applications.

Embodiments of the present invention may be implemented in a variety of cloud and distributed computing implementations. Illustrative but not exhaustive examples include C programming language implementations on the AIX®, a Unix®-based operating system by International Business Machines Corporation (IBM); HP-UX® (HP Unix®); Solaris® operating systems; and Windows® and Linux® operating systems, though other applications may be practiced, and the invention is not limited to the examples provided herein. (AIX is a trademark of the International Business Machines Corporation in the United States or other countries; UNIX is a trademark of The Open Group in the United States or other countries; HP-UX and HP UNIX are trademarks of The Hewlett Packard Corporation in the United States or other countries; SOLARIS is a trademark of the Oracle Corporation in the United States or other countries; WINDOWS is a trademark of the Microsoft Corporation in the United States or other countries; and LINUX is a trademark of Linus Torvalds in the U.S. and other countries.)

Figure 6:
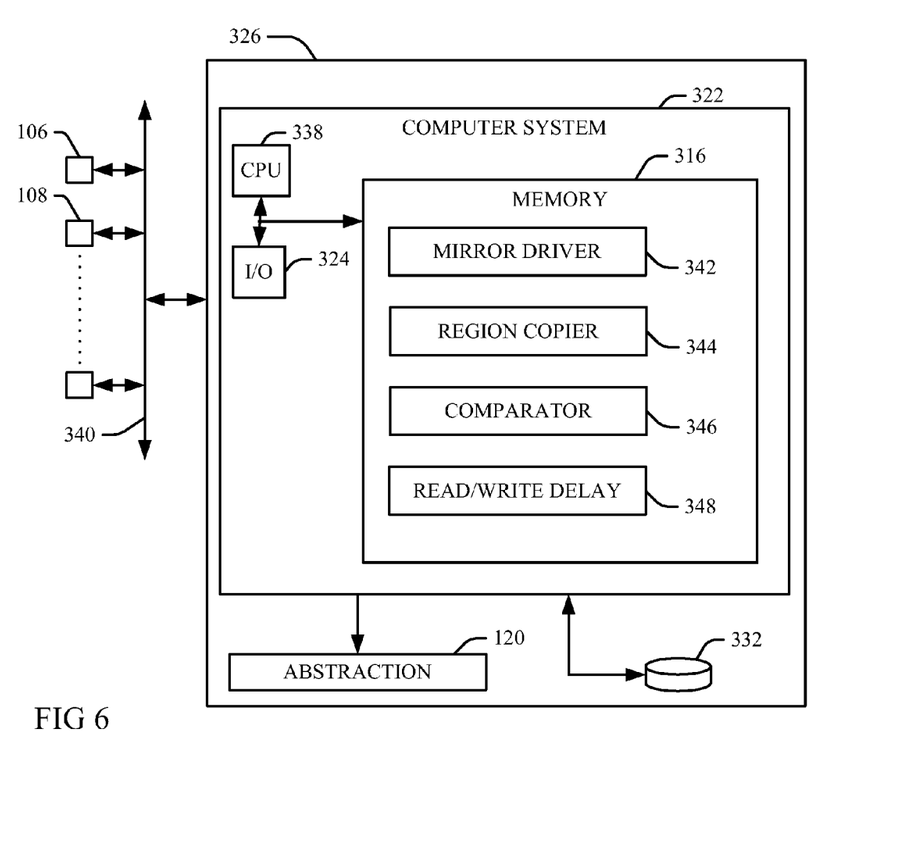
FIG. 6 is a diagrammatic illustration of a computerized implementation of an embodiment of the present invention.

Referring now to FIG. 6, an exemplary computerized implementation of an embodiment of the present invention includes client computer or other programmable device 322 in communication with one or more source device 106 and targets devices 108, each of which may include third party servers accessible through an SSL or other secure web interface 340, for example in response to computer readable code in a file residing in a memory 316 or a storage system 332 through a computer network infrastructure 326. The implementation is intended to demonstrate, among other things, that the present invention could be implemented within a network environment (e.g., the Internet, a wide area network (WAN), a local area network (LAN) or a virtual private network (VPN), etc.) Communication can occur via any combination of various types of communications links: for example, communication links can comprise addressable connections that may utilize any combination of wired and/or wireless transmission methods.

Where communications occur via the Internet, connectivity could be provided by conventional TCP/IP sockets-based protocol, and an Internet service provider could be used to establish connectivity to the Internet. Still yet, the network infrastructure 326 is intended to demonstrate that an application of an embodiment of the invention can be deployed, managed, serviced, etc. by a service provider who offers to implement, deploy, and/or perform the functions of the present invention for others.

The computer 322 comprises various components, some of which are illustrated within the computer 322. More particularly, as shown, the computer 322 includes a processing unit (CPU) 338 in communication with the memory 316 and with one or more external Input/Output (I/O) devices/resources 324, memory abstractions 120 and storage systems 332. In general, the processing unit 338 may execute computer program code, such as the code to implement components that perform one or more of the process steps as illustrated in FIGS. 1-5 and discussed above, including a Mirror Driver component 342, a Region Copier component 344, a Migration Re-Read Comparator 346, and a Read/Write Delay 348. Said computer program code may be stored in the memory 316 and/or external storage system 332.

The network infrastructure 326 is only illustrative of various types of computer infrastructures for implementing the invention. For example, in one embodiment, computer infrastructure 326 comprises two or more computing devices (e.g., a server cluster) that communicate over a network. Moreover, the computer 322 is only representative of various possible computer systems that can include numerous combinations of hardware. To this extent, in other embodiments, the computer 322 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Moreover, the processing unit 338 may comprise a single processing unit, or be distributed across one or more processing units in one or more locations, e.g., on a client and server. Similarly, the memory 316 and/or the storage system 332 can comprise any combination of various types of data storage and/or transmission media that reside at one or more physical locations. Further, I/O interfaces 324 can comprise any system for exchanging information with one or more of the external device 328. Still further, it is understood that one or more additional components (e.g., system software, math co-processing unit, etc.) not shown can be included in the computer 322.

One embodiment performs process steps of the invention on a subscription, advertising, and/or fee basis. That is, a service provider could offer to create, maintain, and support, etc., a computer infrastructure, such as the network computer infrastructure 326 that performs the process steps of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for executing one or more of the processes, systems and articles according to the present invention as described above. In this case, a computer infrastructure, such as the computer infrastructure 326, can be provided and one or more systems for performing the process steps of the invention can be obtained (e.g., created, purchased, used, modified, etc.) and deployed to the computer infrastructure. To this extent, the deployment of a system can comprise one or more of: (1) installing program code on a computing device, such as the computers/devices 322, from a computer-readable medium; (2) adding one or more computing devices to the computer infrastructure; and (3) incorporating and/or modifying one or more existing systems of the computer infrastructure to enable the computer infrastructure to perform the process steps of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof. As used herein, it is understood that the terms "program code" and "computer program code" are synonymous and mean any expression, in any language, code or notation, of a set of instructions intended to cause a computing device having an information processing capability to perform a particular function either directly or after either or both the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

Certain examples and elements described in the present specification, including in the claims and as illustrated in the Figures, may be distinguished or otherwise identified from others by unique adjectives (e.g. a "first" element distinguished from another "second" or "third" of a plurality of elements, a "primary" distinguished from a "secondary," one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for migrating dynamically changing data sets in a distributed application environment, the method comprising:

intercepting via a host device a write to a source device in communication with the host device through a distributed application environment and determining whether data in the source device is being migrated to a target device in communication with the host device and the source device through the distributed application environment;

if determined that the data in the source device is not being migrated to the target device, passing the intercepted write directly to the source;

if determined that the data in the source device is being migrated to the target device, mirror writing the intercepted write synchronously to both the source and the target;

migrating data from the source to the target by reading data in a region of the source and writing originally read source region data to a region of the target and to a mirror writing memory location;

re-reading the source region data and comparing the re-read data to the originally read data written to the mirror writing memory location;

if the compared re-read data does not match the originally read data written to the mirror writing memory location, repeating the migrating the data from the source region to the target region and the re-reading the source region data and the comparing to the originally read data written to the mirror writing memory location until the originally and re-read data match; and if the compared re-read data matches the originally read data written to the mirror writing memory location, iteratively repeating the steps of the migrating, the comparing and the re-reading of data for each of other regions of the source with respect to each of other regions of the target until the originally read data and the re-read data match for each of the other source regions being migrated.

2. The method of claim 1, wherein the data migration comprises copying data from the source device region and writing the copied data to the target region without locking down the source region or the target region.

3. The method of claim 2, further comprising:
acknowledging that the intercepted storage device write has been mirror written to both the source storage device and the target storage device before acknowledging the intercepted storage device write to an upper layer.

4. The method of claim 3, wherein the mirror writing the intercepted storage device write synchronously to the source storage device and to the target storage device is at a host level in a computer infrastructure input and output path.

5. The method of claim 4, wherein the step of, if the compared re-read data does not match the originally read data written to the mirror writing memory location, repeating the migrating the data from the source region to the target region and the re-reading the source region data and the comparing the re-read data to the originally read data written to the mirror writing memory location, further comprises:
repeating the migrating the data from the source region to the target region and the re-reading the source region data and the comparing the re-read data to the originally read data written to the mirror writing memory location until a maximum number of retries is met; and
generating an error message if the maximum number of retries is met.

6. The method of claim 5, wherein the migrating the data from the source to the target region further comprises:
reading data from a plurality of source regions in the source and writing the read source region data to a plurality of regions of the target storage in parallel using multiple threads.

7. The method of claim 5, wherein the intercepted write to the source device is to an existing storage device disk, a logical unit number or a volume manager device driver.

8. A system, comprising:
a processing unit, computer readable memory and a computer readable storage system;
first program instructions to intercept a write to a source device in communication with the processing unit through a distributed application environment and determine whether data in the source device is being migrated to a target device in communication with the processing unit and the source device through the distributed application environment;
second program instructions to, if determined that the data in the source device is not being migrated to the target device, pass the intercepted write directly to the source; and to, if determined that the data in the source device is being migrated to the target device, mirror write the intercepted write synchronously to both the source and the target;
third program instructions for migration of data from the source to the target, the third program instructions to:
read data in a region of the source and write originally read source region data to a region of the target and to a mirror writing memory location;
re-read the source region data and compare the re-read data to the originally read data written to the mirror writing memory location;
if the compared re-read data does not match the originally read data written to the mirror writing memory location, repeat the migration of the data from the source region to the target region, the re-read of the source region data and the compare of the re-read data to the originally read data written to the mirror writing memory location until the originally read data and the re-read data match; and
if the compared re-read data matches the originally read data written to the mirror writing memory location, iteratively repeat the migration of the data, the compare and the re-read of data for each of other regions of the source with respect to each of other regions of the target until originally read data and re-read data match for each of the other source regions migrated; and
wherein the first, second and third program instructions are stored on the computer readable storage system for execution by the processing unit via the computer readable memory.

9. The system of claim 8, wherein the third program instructions for migration of data from the source to the target are further to copy data from the source device region and write the copied data to the target region without locking down the source region or the target region.

10. The system of claim 9, wherein the second program instructions are further to acknowledge that the intercepted storage device write has been mirror written to both the source storage device and the target storage device before acknowledging the intercepted storage device write to an upper layer.

11. The system of claim 10, wherein the second program instructions are further to mirror write the intercepted write synchronously to the source storage device and to the target storage device at a host level in a computer infrastructure input and output path.

12. The system of claim 11, wherein the third program instructions for migration of data from the source to the target are further to read data from a plurality of source regions in the source and write the read source region data to a plurality of regions of the target storage in parallel using multiple threads.

13. The system of claim 11, wherein the second program instructions are further to intercept the write to the source device to an existing storage device disk, a logical unit number or a volume manager device driver.

14. A computer program product for migrating dynamically changing data sets in a distributed application environment, the computer program product comprising:
a non-transitory computer-readable storage medium that is not a signal medium;
first program instructions to intercept via a host device a write to a source device in communication with the host device through a distributed application environment and determine whether data in the source device is being migrated to a target device in communication with the host device and the source device through the distributed application environment;
second program instructions to, if determined that the data in the source device is not being migrated to the target device, pass the intercepted write directly to the source;

and to, if determined that the data in the source device is being migrated to the target device, mirror write the intercepted write synchronously to both the source and the target; and third program instructions for migration of data from the source to the target, the third program instructions to:

read data in a region of the source and write originally read source region data to a region of the target and to a mirror writing memory location;

re-read the source region data and compare the re-read data to the originally read data written to the mirror writing memory location;

if the compared re-read data does not match the originally read data written to the mirror writing memory location, repeat the migration of the data from the source region to the target region, the re-read of the source region data and the compare of the re-read data to the originally read data written to the mirror writing memory location until the originally read data and the re-read data match; and if the compared re-read data matches the originally read data written to the mirror writing memory location, iteratively repeat the migration of the data, the compare and the re-read of data for each of other regions of the source with respect to each of other regions of the target until originally read data and re-read data match for each of the other source regions migrated; and wherein the first, second and third program instructions are stored on the computer readable storage medium.

15. The computer program product of claim 14, wherein the third program instructions for migration of data from the source to the target are further to copy data from the source device region and write the copied data to the target region without locking down the source region or the target region.

16. The computer program product of claim 15, wherein the second program instructions are further to acknowledge that the intercepted storage device write has been mirror written to both the source storage device and the target storage device before acknowledging the intercepted storage device write to an upper layer.

17. The computer program product of claim 16, wherein the second program instructions are further to mirror write the intercepted storage device write synchronously to the source storage device and to the target storage device is at a host level in a computer infrastructure input and output path.

18. The computer program product of claim 17, wherein the third program instructions for migration of data from the source to the target are further to read data from a plurality of source regions in the source and write the read source region data to a plurality of regions of the target storage in parallel using multiple threads.

19. The computer program product of claim 17, wherein the second program instructions are further to intercept the write to the source device to an existing storage device disk, a logical unit number or a volume manager device driver.

20. The computer program product of claim 17, wherein the third program instructions for migration of data from the source to the target are further to:

repeat the data migration from the source region to the target region, the re-read of the source region data and the comparison of the re-read data to the originally read data written to the mirror writing memory location until a maximum number of retries is met; and generate an error message if the maximum number of retries is met.

21. A method of providing a service for migrating dynamically changing data sets in a distributed application environment, the method comprising:

integrating computer-readable program code into a computer infrastructure that comprises a processing unit, a computer readable memory and a computer readable tangible storage medium, wherein the computer readable program code is embodied on the computer readable tangible storage medium and comprises instructions that, when executed by the processing unit via the computer readable memory, cause the processing unit to:

intercept a write to a source device in a distributed application environment and determine whether data in the source device is being migrated to a target device in communication with the source device;

if determined that the data in the source device is not being migrated to the target device, pass the intercepted write directly to the source;

if determined that the data in the source device is being migrated to the target device, mirror write the intercepted write synchronously to both the source and the target;

migrate data from the source to the target by reading data in a region of the source and write originally read source region data to a region of the target and to a mirror writing memory location;

re-read the source region data and compare the re-read data to the originally read data written to the mirror writing memory location;

if the compared re-read data does not match the originally read data written to the mirror writing memory location, repetitively migrate the data from the source region to the target region and re-read the source region data and compare the re-read data to the originally read data written to the mirror writing memory location until the originally read data and the re-read data match; and if the compared re-read data matches the originally read data written to the mirror writing memory location, iteratively repeat migrating, comparing and re-reading of data for each of other regions of the source with respect to each of other regions of the target until originally read data and re-read data match for each of the other source regions being migrated.

* * * * *